United States Patent [19]

McCurdy et al.

[11] Patent Number: 4,741,109
[45] Date of Patent: May 3, 1988

[54] ROLLER CALIPER GAUGE

[75] Inventors: Donald J. McCurdy, Stouffville; Michael T. Riggin, Concord, both of Canada

[73] Assignee: Sentrol Systems, Ltd., Ontario, Canada

[21] Appl. No.: 928,882

[22] Filed: Nov. 7, 1986

[51] Int. Cl.⁴ .............................................. G01B 3/22
[52] U.S. Cl. .................... 33/147 L; 33/143 L
[58] Field of Search ............ 33/147 L, 147 N, 147 E, 33/143 L; 324/229

[56] References Cited

U.S. PATENT DOCUMENTS

| | | | |
|---|---|---|---|
| 2,503,720 | 4/1950 | Gieseke | 33/147 L |
| 2,932,089 | 4/1960 | Dexter | 33/147 L |
| 3,513,555 | 5/1970 | Vachon | 33/147 L X |
| 3,528,002 | 9/1970 | Dunlavey | 33/147 L |
| 3,943,632 | 3/1976 | Albertazzi | 33/143 L |

Primary Examiner—Harry N. Haroian
Attorney, Agent, or Firm—Shenier & O'Connor

[57] ABSTRACT

A roller caliper gauge for providing an accurate measurement of the thickness of a high speed web of paper or the like in which a proximity device located within a housing disposed between a pair of rollers on a head on one side of the web is responsive to a web in an operative position adjacent to the housing. A platen on a head on the other side of the housing is pneumatically moved toward the rollers to cause the web to make line contact with the rollers when in the operative position.

11 Claims, 2 Drawing Sheets

ROLLER CALIPER GAUGE

FIELD OF THE INVENTION

The invention is in the field of instruments for measuring the thickness of a web and, more specifically, the invention relates to a roller caliper gauge which is especially adapted for use in controlling the nip of calendar stacks via actuator systems such as forced air or induction heating systems for regulation of product thickness of a moving web.

BACKGROUND OF THE INVENTION

In the manufacture of paper such as newsprint, one of the finishing operations performed is that of calendaring. One of the variables which is controlled in the course of the calendaring operation to govern the character of the finished product is the thickness of the paper being calendared. One system which is employed to control the web caliper is an arrangement of air showers comprising a plurality of valves which are regulated to control the shower of air directed against the web.

In the prior art, a reel hardness sensor is used to generate a signal which controls the air valves. More particularly, the reel hardness sensor is a disc containing a piezoelectric crystal. The disc rotates against the paper reel to cause the crystal to put out a signal as a measure of reel hardness.

Accurate caliper measurement is found to be of particular importance in newsprint roll building. The system of the prior art described hereinabove does not permit of measurement to afford the desired degree of control of peak to peak profiles as is desirable in newsprint roll building. In addition, in the case of a calendar stack control using reel hardness control, the usage of hot and cold air is excessive owing to the inherent time delay between a corrective calendar stack change and the subsequent result as seen on the reel hardness profile.

SUMMARY OF THE INVENTION

One object of our invention is to provide a roller caliper gauge which is especially adapted for use in newsprint roll building.

Another object of our invention is to provide a roller caliper gauge which affords a closer control of peak to peak profiles in newsprint roll building than do systems of the prior art.

Still another object of our invention is to provide a roller caliper gauge adapted to achieve peak to peak profiles of less than 3 microns in the manufacture of newsprint as compared with 8.0 to 10 microns using the reel hardness control arrangement of the prior art.

Yet another object of our invention is to provide a roller caliper gauge which reduces usage of hot and cold air in a calendar stack control with air showers to only 15 percent of maximum from about 65 percent of maximum when using reel hardness control as in the prior art.

Still another object of our invention is to provide a roller caliper gauge which substantially eliminates the inherent time delay between a corrective stack change and the subsequent result as seen on the reel hardness profile in systems of the prior art.

A still further object of our invention is to provide an on-line caliper sensor which is capable of measuring newsprint profiles at speeds in excess of 3,000 ft. per minute with an absolute accuracy of better than ± one micron.

A still further object of our invention is to provide a roller caliper gauge which affords a precise measurement of thickness on a high-speed paper web.

Yet another object of our invention is to provide a roller caliper gauge which is adapted for use in measuring the thickness of a web having an adhesive coating on one side.

A still further object of our invention is to provide a roller caliper gauge for use on a very wide web where it is difficult to achieve a close tolerance on the relative lateral positioning of the two sides of the sensor.

Other and further objects of our invention will appear from the following description.

BRIEF DESCRIPTION OF THE DRAWINGS

In the accompanying drawings to which reference is made in the instant specification and which are to be read in conjunction therewith and in which like reference characters are used to indicate like parts in the various views.

DESCRIPTION OF THE PREFERRED EMBODIMENT

Figure 1:
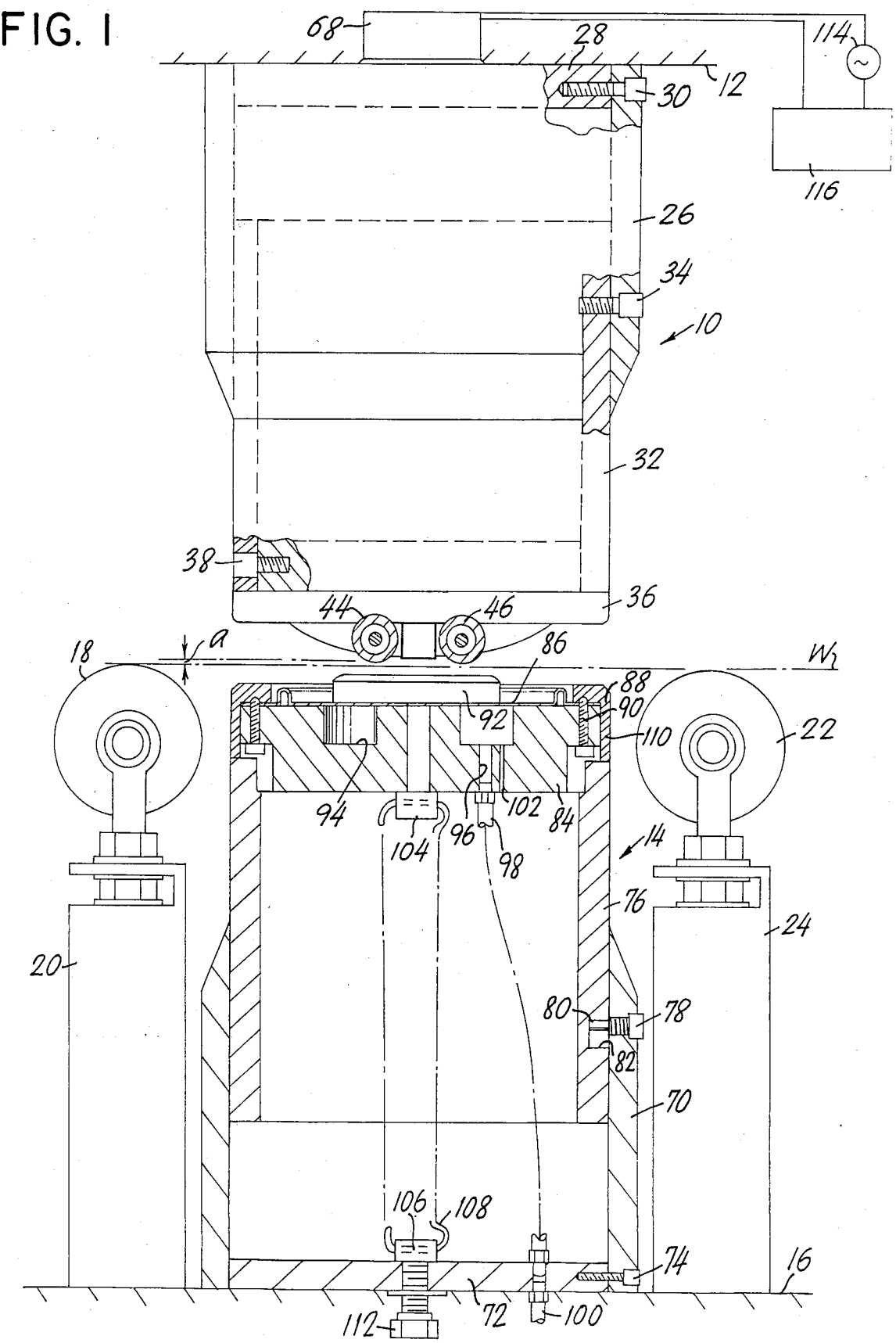
FIG. 1 is an elevation of our roller caliper gauge with parts shown in section.

Referring now to the drawings, our roller caliper gauge which is adapted to make a precise measurement of the thickness of a moving web W indicated in dot-dash lines in FIG. 1, includes an upper head indicated generally by the reference character 10 carried by a support 12. The upper head 10 cooperates with a lower head indicated generally by the reference character 14 carried by a support 16. The web W passes over an entry roller 18 supported on space pedestals, one pedestal 20 of which is shown in FIG. 1 as it moves into the space between heads 10 and 14. After leaving the space between the heads, the web travels over an exit roller 22 supported on a pair of spaced pedestals, one pedestal 24 of which is shown in FIG. 1.

The upper head 10 includes an upper head housing upper half 26, the upper end of which is closed by an end plate 28 secured to the upper housing half 26 by any suitable means such as by screws 30. An upper head housing lower half 32 partially telescopes within the upper half 26 and is attached thereto by any suitable means, such for example as screws 34. The lower end of the lower half 32 is closed by a lower end plate 36 to be described more fully hereinbelow. Screws or the like 38 secure the end plate 36 in the head 32.

Plate 36 carries a pair of spaced roller bearing supports 40 and 42 secured to the plate by any suitable means such as by welding or the like. A pair of rollers 44 and 46 are rotatably carried by the supports 40 and 42 in a manner to be described.

Figure 2:
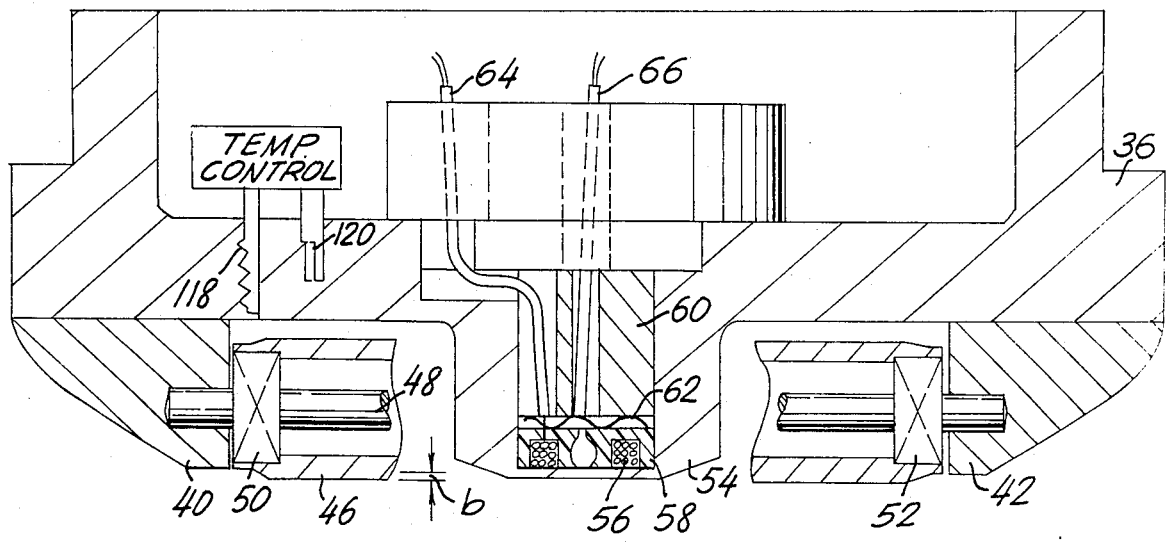
FIG. 2 is a fragmentary sectional view with parts broken away of the sensor head of our roller caliper gauge.
Figure 3:
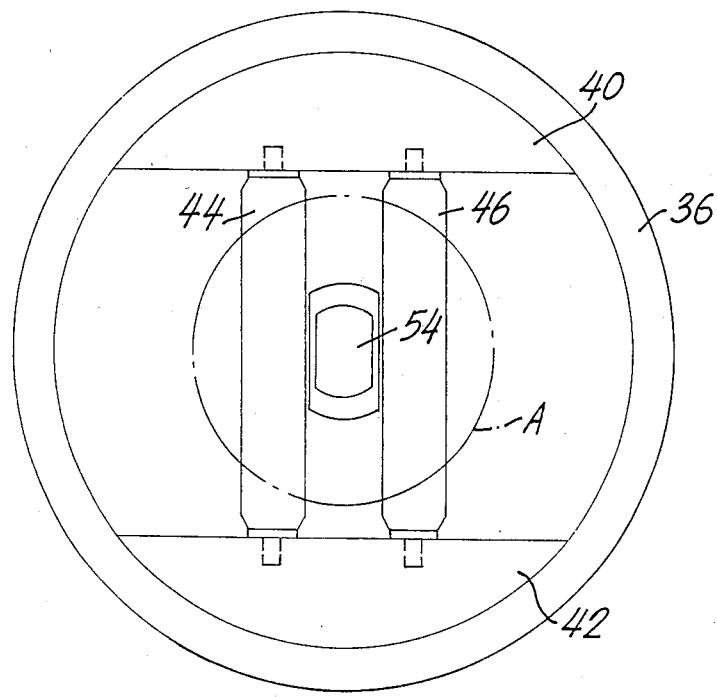
FIG. 3 is a bottom plan of the sensor head of our roller caliper gauge.

Each of the rollers 44 and 46 has a shaft 48 secured in the supports 40 and 42. Each shaft 48 carries a pair of spaced bearings 50 and 52, the outer rings of which are received in the ends of the associated roller such as the roller 46 shown in FIG. 2.

We form the lower end plate 36 with a housing 54 extending downwardly between the rollers 44 and 46 at a location about halfway along the lengths of the rollers. Housing 54 receives an inductive coil 56 embedded in a suitable potting compound 58. A plug 60 retains the coil 56 within the housing 54. A spring 62 is disposed between the plug 60 and the coil properly to position the coil within the housing 54. Respective electrical leads 64 and 66 from the coil 56 pass through suitable openings in the plug 60 to the interior of the upper head 10 and to a connector 68 carried by the upper end plate 28. Suitable connections can be made from the connector 68 to the external circuitry.

The lower head 14 includes a lower half 70 which for purposes of ease in manufacture is substantially identical to the upper half 26 of the upper head 10. We secure a lower end plate 72 in the lower end of housing half 70 by any suitable means, such for example as by screws 74. Lower head 14 includes an upper half 76 which is retained in assembled relationship with the lower half 70 by means of screws 78, the inner ends of which are formed as pins 80 disposed in slots 82 in the outer surface of the upper half 76.

The lower head 14 includes an upper end plate 84. A diaphragm 86 extending over the upper surface of the plate 84 is retained in position on the plate 84 by a retaining ring 88 secured to the plate 84 by screws 90 or the like. Diaphragm 86 carries a pressure pad or platen 92 which is adapted to be actuated in a manner to be described to hold the web W in engagement with the rollers 44 and 46.

We form the upper surface of the plate 84 with an annular passage 94 to which air under pressure is fed through an inlet passage 96 by means of a hose 98. We connect the hose 98 to a hose 100 leading to a suitable supply (not shown) of air under pressure. A relief passage 102 having a diameter considerably smaller than that of the passage 98 connects the annular space 94 to the interior of the lower head 14.

Respective upper and lower fittings 104 and 106 screwed into the upper and lower plates 84 and 72 receive the ends of a spring 108 which draws the upper plate 84 downwardly to bring a peripheral flange 110 on the retaining ring 88 into engagement with the upper end of the housing upper half 76. The head 112 may be turned to adjust the tension of the spring 108 to the degree desired for proper operation of the device.

In operation of our roller caliper gauge in a system, for example, for controlling the calendar stack nip in a high speed newsprint-forming machine, head 10 is set up with relation to the rollers 18 and 22 so that the distance "a" between a plane tangent to the rollers 44 and 46 and a plane tangent to the rollers 18 and 22 is about 0.040 inches. The head 10 is arranged so that the distance "b" between a plane tangent to the rollers 44 and 46 and the plane in which the lower surface of housing 54 lies is about 0.007 inches. The current from a suitable alternating current source 114 is passed through the coil 56. In response to a change in the inductance of the coil resulting from a variation in the thickness of the web W a control system 116 puts out a suitable signal which is a measure of thickness and which may be used, for example, to control the calendar air shower valves.

Advantages inherent in inductive measuring techniques in general are their immunity to noise and their ability to operate in harsh environments. However, problems arise when applying such techniques to a moving paper web. Factors such as vibration, low web strength, high web speeds, adhesive coatings, embedded slugs and shives, lateral positioning errors and wide temperature excursions all contribute to runability problems such as sheet breaks, holes or streaking, and measurement errors. Our system provides a solution to such problems.

When our system is running, air under pressure is supplied to the space provided by recess 94 to move the pad or reference platen 92 upwardly into engagement with the under side of the web W to move the upper surface of the web into engagement with the rollers 44 and 46. This engagement of the upper surface of the web is limited to line contact with the rollers 44 and 46.

The restriction of contact between the web and the non-rolling side of the sensor system to the two lines of closest approach between the rollers 44 and 46 on one side and the flat surface of the platen 92 on the other side appreciably reduces the lateral drag force as compared with sensors of the prior art. If the rollers 44 and 46 were not present, atmospheric pressure would hold the web in close contact with the central portion of the flat surface of platen 92 creating drag which by itself would be enough to break the paper web W at high speeds. In designs of the prior art where contact with the web is on both sides, the additional drag caused by the resulting pinching effect can break the web at lower speeds and where stronger papers are being made.

An additional defect resulting from the pinching effect characteristic of two-sided contacting sensor designs, was the requirement that the reference platen had to be of low mass to accommodate the presence of shives and slugs in the web which tended to cause frequent sheet breaks. In our arrangement these paper contaminants no longer cause problems and the reference platen 92 can now be made thicker and more temperature stable resulting in increased accuracy.

For the same reason, the reference platen can be made larger in diameter, thus decreasing its sensitivity to lateral alignment errors inherent in wide or infrequently serviced scanning mechanisms. Our system thus contributes to improved initial and long-term precision as compared with arrangements of the prior art.

Preferably, to improve measurement stability we hold the housing 54 at a constant temperature using a heater 118 and a temperature sensing element 120 connected in a feedback circuit. Our system provides good control of the measuring coil temperature, owing to the fact that it is separated from the web W by a heat insulating air gap "b" of approximately 7 to 10/1000 of an inch. This improved temperature regulation results in improved accuracy because of smaller measurement shifts going on and off sheet, smaller temperature gradients within the coil housing 54, less heater power required to maintain a given temperature and a less critical relationship between the heater set point and the web temperature. We attach the rollers 44 and 46 to the upper head 10 with sufficient space around them to avoid attracting water into the housing via the Magnus effect which results in an area of low pressure at the trailing edge of a high speed roller. The sheet forming rollers 18 and 22 smooth out the pass line of the web in the presence of flutter and wrinkles in the web, as is well known to persons skilled in the art.

In operation of the system in the manufacture of newsprint at high speeds, the rollers 44 and 46 press about ⅛ of an inch into the web pass line as defined by the sheet-forming rollers 18 and 22. This distance may be reduced for stiffer, heavier weight sheets or increased for soft sheets.

The Magnus effect contributes to the reduction of drag by relieving the atmospheric pressure which would normally keep the reference platen in contact with the moving web. As a result, the web contacts the reference platen only at the two lines of closest approach of the platen 92 and the rollers 44 and 46.

The bleed passage 102 enables the platen to move more freely, allows the use of a more rugged pressure gauge and improves the operation of the pressure regulator.

Optional components (not shown) of a type well-known in the art, such as pneumatic, hydraulic or electromechanical actuators, to move the system on or off sheet may be included. The measuring and temperature control circuits employed with our system use standard inductive and thermoelectric techniques well-known to those skilled in the art. Calibration may be performed using stationary, laboratory-calibrated standards made of glass, mica, mylar or other stable non-conductive materials. Conductive materials such as stainless steel, brass or titanium may be used with magnetically permeable reference targets if suitable allowances are made which are dependent upon the particular gauge elements employed.

It will be seen that we have accomplished the objects of our invention. We have provided a roller caliper gauge which is especially adapted for use on high speed webs. Our roller caliper gauge affords a closer control of peak to peak profiles than do reel hardness control systems of the prior art. Our roller caliper gauge appreciably reduces hot and cold air usage in a system for controlling a calendar stack with air showers. Our on-line caliper sensor is capable of measuring newsprint profiles at speeds in excess of 3000 per minute with an accuracy of better than ± one micron. Our gauge is adapted for use in measuring the thickness of a web having a sticky coating on one side. It is useful on a very wide web where it is difficult to achieve a close tolerance on the relative lateral positioning of the two sides of the sensor.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. An on-line gauge for providing a measure of the thickness of a web moving in the direction of its length including in combination, a pair of elongated rollers, a platen, means mounting said rollers and said platen on opposite sides of said moving web and for movement toward and away from each other, said mounting means mounting said rollers with the lengths thereof generally perpendicular to said direction and parallel to each other in spaced relationship in said direction, a proximity device for producing a signal as a measure of the thickness of a web, means mounting said proximity device on the same side of said web as said rollers and in the space therebetween, and pneumatic means for moving said platen and said rollers toward each other to bring said web into engagement with said rollers and into proximity with said device.

2. A gauge as in claim 1 in which said device comprises a housing, said housing being spaced from said web when said web engages said rollers.

3. An on-line gauge for providing a measure of the thickness of a web moving in the direction of its length including in combination an upper head, a lower head, means mounting said heads in spaced relationship on opposite sides of said web, a pair of elongated rollers, means mounting said rollers on one of said heads with the lengths thereof generally perpendicular to said direction and parallel to each other in spaced relationship in said direction, a proximity device for producing a signal as a measure of the thickness of a web in proximity thereto, means mounting said proximity device on said one head within the space between said rollers, a platen, means mounting said platen on the other head for movement toward and away from said rollers, and pneumatic means for urging said platen toward said rollers to bring said web into engagement with said rollers and into proximity with said device.

4. A gauge for providing a measure of the thickness of a moving web including in combination an upper head, a lower head, means mounting said heads in spaced relationship on opposite sides of said web, a housing on one of said heads extending toward said web, said housing having a surface adjacent to said web, means including a proximity device within said housing for producing a signal as a measure of the thickness of a web in an operative position in relation to said housing, a pair of elongated rollers, means mounting said rollers on said one head with the lengths thereof generally perpendicular to the direction of movement of said web and parallel to each other in spaced relationship in said direction with said housing disposed therebetween, siad housing being above the plane of closest approach of said rollers to said web, a platen spanning said rollers in the direction perpendicular to the lengths thereof, means mounting said platen on the other of said heads for movement toward and away from said rollers and penumatic means for moving said platen toward said rollers to cause said web to make substantially line contact with said rollers.

5. A gauge as in claim 4 in which said means mounting said platen on said other head comprises a diaphragm, said pneumatic means comprising means for creating a pressure of air behind said diaphragm.

6. A gauge as in claim 4 in which said means mounting said platen on said other head comprises a plate and a diaphragm on said plate supporting said platen, said pneumatic means comprising an air chamber formed in said plate behind said diaphragm and means for supplying air under pressure to said chamber.

7. A gauge as in claim 6, including a relief passage leading out of said chamber.

8. A gauge as in claim 7 including means for controlling the temperature of said housing.

9. A gauge as in claim 7 including means for controlling the temperature of said housing.

10. A gauge as in claim 6, including means for controlling the temperature of said housing.

11. A gauge as in claim 4 in which said proximity device is an inductance coil.

* * * * *

UNITED STATES PATENT AND TRADEMARK OFFICE
CERTIFICATE OF CORRECTION

PATENT NO. : 4,741,109
DATED : May 3, 1988
INVENTOR(S) : Donald J. McCurdy & Michael T. Riggin It is certified that error appears in the above-identified patent and that said Letters Patent are hereby corrected as shown below:

In the Claims:

Claim 8, line 1, change "7" to --4--.

Signed and Sealed this

Sixth Day of September, 1988

Attest:

DONALD J. QUIGG

Attesting Officer

Commissioner of Patents and Trademarks